United States Patent [19]

Peterreins

[11] Patent Number: 5,799,492
[45] Date of Patent: Sep. 1, 1998

[54] HYDRODYNAMIC UNIT, PARTICULARLY FOR THE TRANSMISSION LINE OF A MOTOR VEHICLE

[75] Inventor: Klaus Peterreins, Poecking, Germany

[73] Assignee: Bayerische Motoren Werke Aktiengesellschaft, Munich, Germany

[21] Appl. No.: 695,346

[22] Filed: Aug. 9, 1996

[30] Foreign Application Priority Data

Aug. 12, 1995 [DE] Germany .................. 195 29 739.3

[51] Int. Cl.[6] .................................................. F16D 33/00
[52] U.S. Cl. ............................................ 60/343; 60/358
[58] Field of Search .......................... 60/341, 343, 347, 60/357, 358, 363, 367

[56] References Cited

U.S. PATENT DOCUMENTS

| | | | |
|---|---|---|---|
| 3,079,756 | 3/1963 | Farrell | 60/343 |
| 3,841,094 | 10/1974 | Cobb | 60/367 X |
| 4,004,417 | 1/1977 | Woody et al. | 60/363 |
| 4,041,701 | 8/1977 | Goto et al. | 60/367 X |
| 4,203,288 | 5/1980 | Nichols | 60/347 X |
| 4,510,747 | 4/1985 | Yoshida | 60/343 |

FOREIGN PATENT DOCUMENTS 11 52 587  12/1957  Germany .
23 59 895 B2  11/1973  Germany .

*Primary Examiner*—Hoang Nguyen
*Attorney, Agent, or Firm*—Evenson, McKeown, Edwards & Lenahan, P.L.L.C.

[57] ABSTRACT

A hydrodynamic unit, particularly for the transmission line of a motor vehicle, which, in addition to a main pump wheel, also has an auxiliary pump wheel which can be frictionally connected with the main pump wheel in the circumferential direction via a coupling. The coupling, which can be controlled by the admission of pressure, is constructed in the inside torus of the hydrodynamic unit and permits the energy absorption volume of the hydrodynamic unit to be varied in order to improve the starting behavior of the motor vehicle from a stopped position.

20 Claims, 2 Drawing Sheets

2

HYDRODYNAMIC UNIT, PARTICULARLY FOR THE TRANSMISSION LINE OF A MOTOR VEHICLE

BACKGROUND AND SUMMARY OF THE INVENTION

This invention relates to a hydrodynamic unit, particularly for the transmission line of a motor vehicle.

German Patent Document DE-AS 23 59 895 describes such a hydrodynamic unit which has a main pump wheel and an auxiliary pump wheel. Both pump wheels can be coupled with one another for the transmission of power by way of a coupling which is acted upon by the pressure force of the axial thrust of the turbine wheel. By means of the coupling, the hub of the auxiliary pump wheel can be connected with the outside torus of the pump wheel. For this purpose, the auxiliary pump wheel must be designed such that its spokes cross the flow path of the working fluid.

This has the disadvantage that, as a result of the spokes of the auxiliary pump wheel, the energy transmission between the pump and the turbine is disturbed. Furthermore, the auxiliary pump wheel has a complicated construction and requires a relatively large amount of space within the hydrodynamic unit.

It is therefore an object of the present invention to provide a hydrodynamic unit of the type generally described above in which the auxiliary pump wheel is constructed such that it is arranged in the hydrodynamic unit in a space-saving manner and that a pressure difference in the working fluid can be used for adjusting an operating condition of the coupling.

According to the present invention, this and other objects have been achieved by providing a hydrodynamic unit for a transmission of a motor vehicle comprising: a main pump wheel connected with an input shaft and having a blading; a turbine wheel connected with an output shaft having a blading; an auxiliary pump wheel having a blading; a core being defined by a respective inside torus of each of the main pump wheel blading, the turbine wheel blading, and the auxiliary pump wheel blading, said core containing a working fluid at a pressure; and at least one coupling arranged in said core in communication with said working fluid, said at least one coupling being configured to selectively couple and uncouple said main pump wheel with said auxiliary pump wheel.

According to the invention, at least one coupling is mounted in a core of the hydrodynamic unit, the pressure of the working fluid in the core being used as an actuating force for the opening or closing of the coupling. This mounting of the coupling within the inside torus of the blading has the advantage that the otherwise empty core of the hydrodynamic unit is utilized for housing the coupling and the coupling therefore does not require space at any other point. Furthermore, the circulation of the working fluid is penetrated only by the blading of the corresponding wheel. Other parts of the auxiliary pump wheel which are required for its bearing do not extend through the circulation of the working fluid and therefore also do not impair the efficiency of the hydrodynamic unit by occurring flow losses. In addition, advantageously, the pressure of the working fluid applied from the outside in the core of the hydrodynamic unit is used for adjusting the operating condition (closing or opening) of the coupling.

In an advantageously simple manner, the bearing of the auxiliary pump wheel can be constructed in the interior shell of the main pump wheel.

If the coupling in the core of the hydrodynamic unit consists of a piston/cylinder unit, in which case one element respectively—piston or cylinder—is mounted on one pump wheel—main pump wheel or auxiliary pump wheel—respectively, this has the advantage that the admission of pressure for the opening or closing of the coupling can take place very easily by means of the pressurized working fluid in the inside torus.

This is particularly simple if the auxiliary pump wheel is axially displaceably guided on the main pump wheel and the piston/cylinder unit is constructed as a ring piston in the inside torus of the hydrodynamic unit on the auxiliary pump wheel and as a ring cylinder in the inside torus on the main pump wheel. In this case, the bearing of the auxiliary pump wheel on the main pump wheel by way of partial surfaces constructed, for example, as slide bearings on the ring piston and the ring cylinder advantageously results in a particularly space-saving construction.

Without any high constructive expenditures, the coupling can be controlled by a control pressure line to the cylinder interior and a devices for venting the piston/cylinder unit. When the control pressure line is guided by way of the outside torus of the main pump wheel to its inside torus, advantageously no additional components must be made available. By means of the device for the venting, the axial movement of the auxiliary pump wheel is limited in a simple manner without stops. As a result, frictional losses are kept low.

When the coupling has to transmit high forces, it can advantageously be constructed as a plate clutch with one or several plates.

These and other objects, features and advantages of the present invention will become more readily apparent from the following detailed description when taken in conjunction with the accompanying drawings.

DETAILED DESCRIPTION OF THE DRAWINGS

Figure 1:
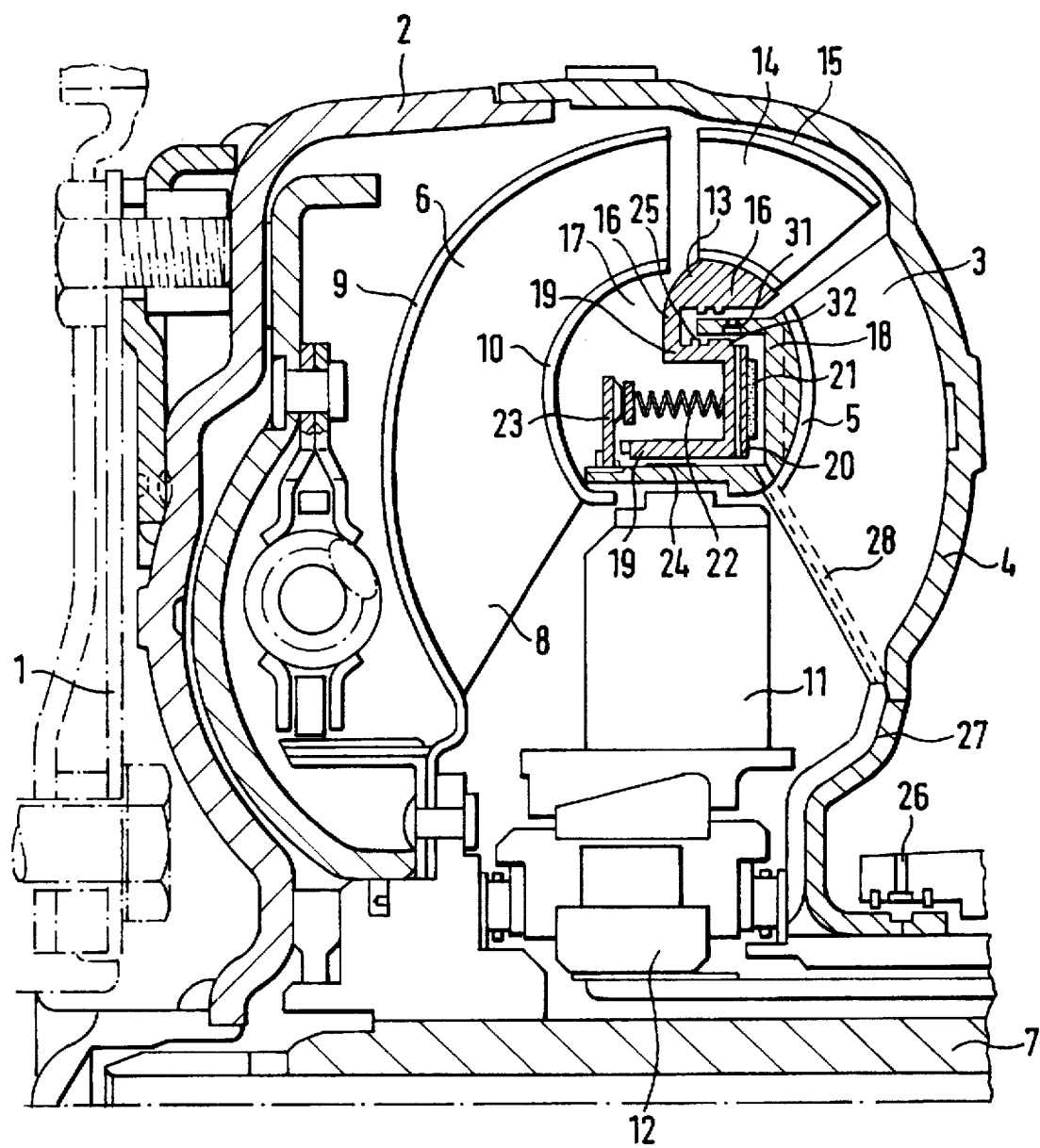
FIG. 1 is a schematic partial sectional view of the upper part of a hydrodynamic torque converter according to a preferred embodiment of the present invention.

According to FIG. 1, in the transmission line of a motor vehicle which is not shown, torque is transmitted from the internal-combustion engine, which is not shown, by way of a driving plate 1 to a housing 2 of a hydrodynamic unit, in this case shown as a hydrodynamic torque converter. On the housing 2 of the hydrodynamic torque converter, a blading 3, i.e. a plurality of blades, is mounted as the main pump wheel which extends between its outside torus 4 and its inside torus 5. The drive torque is transmitted from this main pump wheel by circulation of a working fluid which is not shown to a turbine wheel 6 which is connected with an output shaft 7. The output shaft 7 transmits the torque to other parts of the transmission line, for example, to a transmission which is not shown.

A blading 8 of the turbine wheel 6 extends between its outside torus 9 and its inside torus 10. A guide wheel 11 is also situated in the working fluid circulation and is disposed by way of a free wheel 12 and permits that the output torque can be influenced in proportion to the drive torque.

Furthermore, an auxiliary pump wheel 13 is housed in the working fluid circulation. Its blading 14 extends between an outside torus 15 and an inside torus 16 and is situated between the blading 3 of the main pump wheel and the blading 8 of the turbine wheel 6.

The inside tori 5, 10, 16 of the individual bladings 3, 8, 14 as well as of the guide wheel 11 define a core 17 of the hydrodynamic converter. In this core 17, the auxiliary pump wheel 13 is rotatably and axially displaceably disposed with respect to the inside torus 5 of the main pump wheel. For this purpose, the inside torus 5 of the main pump wheel has a ring cylinder 18 which extends in the axial direction and which interacts as a piston/cylinder unit with a ring piston 19 which is constructed on the inside diameter of the auxiliary pump wheel 13. On the piston bottom 20 of the ring piston 19, a friction lining 21 is mounted which faces the interior of the ring cylinder 18.

In the side of the ring piston 19 which is open toward the core 17, the piston bottom 20 is supported by way of a spring element 22 on an abutment 23 of the main pump wheel. The spring 22 is movably mounted on the abutment 23 by way of a bearing. By way of a slide surface 24, such as a slide bearing, the inside diameter of the ring cylinder 18 carries the inside diameter of the ring piston 19. As a result, the auxiliary pump wheel 13 and the main pump wheel can be moved with respect to one another in the axial as well as in the circumferential direction. The piston/cylinder unit is sealed off, for example, by means of a labyrinth seal 25, as well as by way of the slide bearing so that, as the result of the admission of pressure to the interior of the ring cylinder 18, the auxiliary pump wheel 13 can be moved away from the main pump wheel in the axial direction. In this case, the frictionally engaged connection of the auxiliary pump wheel 13 with the main pump wheel will be released when the friction lining 21 is no longer pressed with sufficient force against the base area of the ring cylinder 18. This frictional engagement fixes the two pump wheels—the auxiliary pump wheel 13 and the main pump wheel—to one another in the circumferential direction when no control pressure is present on the ring cylinder 18.

By dividing the pump into an auxiliary pump wheel 13 and a main pump wheel, in which case both pump wheels can be coupled with one another in the circumferential direction for the transmission of power, the torque absorption of the pump can be influenced to approximately the factor 2.5. As a result, a wide-band variation of the cooperation of the converter with the engine becomes possible. When the pump wheels are coupled, a higher energy transmission takes place between these and the turbine wheel 6 than in the case of an auxiliary pump wheel 13 which runs along freely in the flow. In the latter condition, the rotational speed of the main pump wheel in the case of a predetermined drive torque is increased in that the torque transmission capacity of the torque converter is reduced when the auxiliary pump wheel 13 is disengaged from the main pump wheel. As the result of this measure, the starting behavior of vehicles, i.e., the movement of vehicles from a stopped position, particularly vehicles having cold charged diesel engines, can be improved.

For uncoupling the auxiliary pump wheel 13 from the main pump wheel, the piston/cylinder unit is acted upon by working fluid subjected to the transmission main pressure which displaces the auxiliary pump wheel 13 in the axial direction (to the left in FIG. 1). As a result, independently of the rotational speed of the main pump wheel, this auxiliary pump wheel 13 can rotate freely on the main pump wheel and no longer contributes to the power transmission.

The control of the torque absorption capacity of the pump takes place as follows. In the normal operation, the auxiliary pump wheel 13 and the main pump wheel are frictionally connected in the circumferential direction by way of the friction lining 21. The contact pressure force for the auxiliary pump wheel 13 originates mainly from the working fluid in the core 17 which loads the auxiliary pump wheel 13 in the direction of the main pump wheel with the pressure existing in the core 17. The spring element 22, which also exercises a pressure force in the same direction, also adds to the contact pressure force. If the frictional connection between the auxiliary pump wheel 13 and the main pump wheel is to be disengaged, for example, in the case of lower rotational speeds of the internal-combustion engine, a control unit, which is not shown, causes the ring cylinder 18 to fill with working fluid. The working fluid is subjected to a main transmission pressure which is higher than the contact pressure force existing in the core 17 of the torque converter and the pressure of the spring element 22 together. The ring piston 19 therefore moves in the axial direction until the working fluid can escape from the ring cylinder 18 through a device for venting the piston/cylinder unit. This device for the venting is constructed as a ring duct 31 on the ring cylinder 18 provided with a venting bore which establishes a connection between the ring cylinder 18, which is subjected to the main transmission pressure, and the working fluid in the blading 3, 14 of the pump wheels, which is subjected to a lower pressure.

The ring duct 31 interacts with the control edge 32 on the piston bottom 20 as a control valve in such a manner that, in the uncoupled condition of the pump wheels, an equilibrium of forces occurs on the inside torus 16. As a result, the axial movement of the auxiliary pump wheel 13 in the opening direction of the coupling is limited and the construction of an axial bearing between the ring piston 19 and the abutment 23 is eliminated.

The supply of the ring cylinder 18 with the working fluid subjected to the main transmission pressure from outside the hydrodynamic converter takes place by way of a working fluid supply 26, and from there by way of a working fluid duct 27 in the outside torus 4 of the main pump wheel to its inside torus 5 through a bore 28 in the blading 3 of the main pump wheel.

In the coupled condition of the pump wheels, the control pressure line which leads into the interior of the ring cylinder 18 and comprises the working fluid supply 26, the working fluid duct 27 and the bore 28, is either vented to ambient pressure or sealed off, by way of a control unit, which is not shown.

If the control pressure line is vented to ambient pressure outside the torque converter, the ring piston 19 is acted upon in the engaging direction of the coupling (to the right in FIG. 1) by the difference of the pressures in the core 17 and of the environment. If the control pressure line is sealed off, the ring piston 19 is acted upon in the engaging direction of the coupling by the difference of the pressures in the core 17 and of the transition point of the bladings 3 and 14 through which the working fluid flows. According to the operating condition of the torque converter, the highest possible transmission capacity of the coupling can therefore be achieved by the venting or sealing off of the control pressure line.

Figure 2:
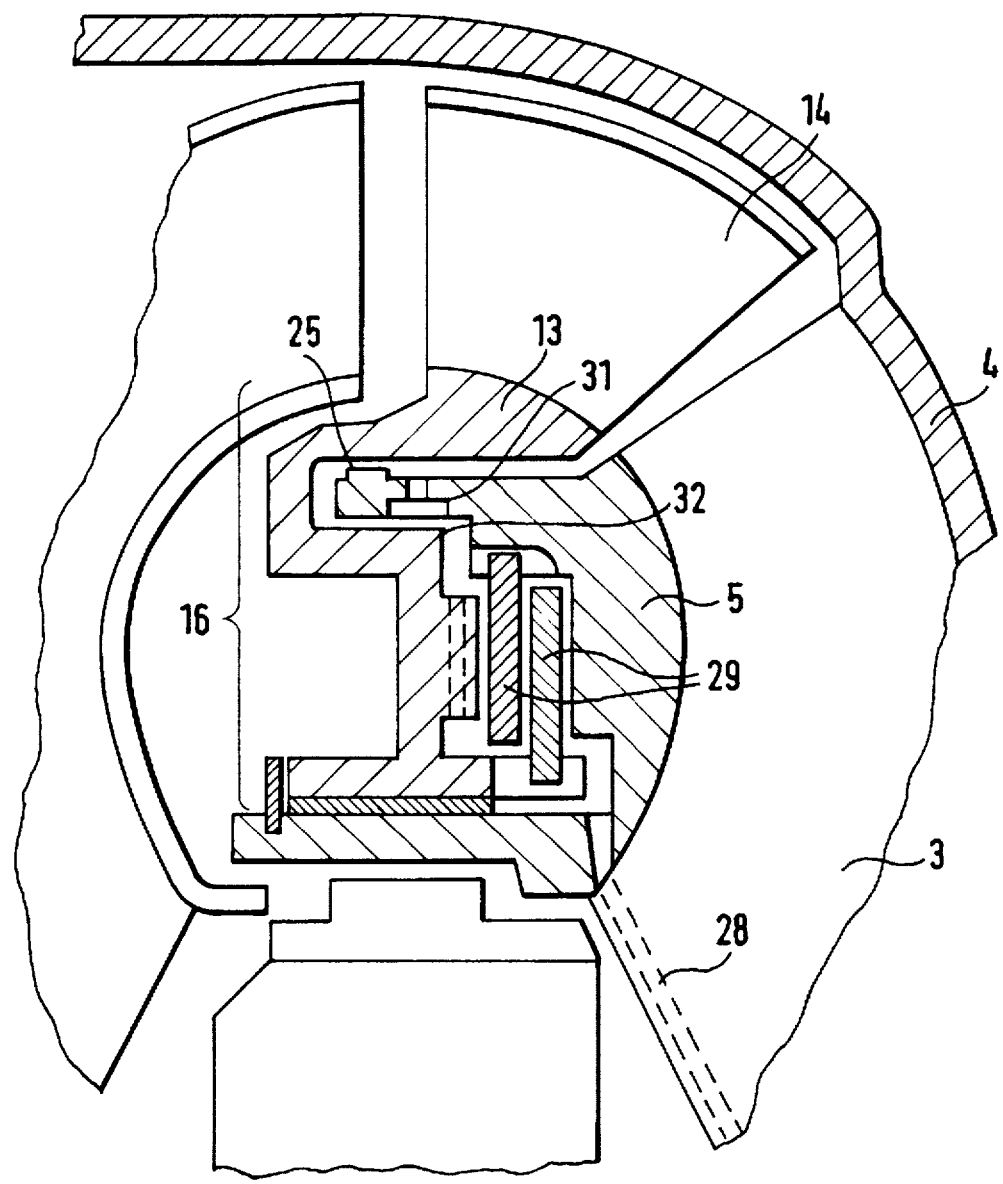
FIG. 2 is a sectional cutout in the area of the inside torus of the pump wheels of a hydrodynamic torque converter according to another embodiment of the present invention.

FIG. 2 illustrates the construction of a coupling between the auxiliary pump wheel 13 and the main pump wheel as a plate clutch. By using multiple plates 29, the holding force of the clutch is increased, due to a larger number of friction surfaces. As a result, lay-out range is also gained for the opening pressure of the clutch, for the design of the pressure surfaces operative for the opening and for the design of the blading 14 of the auxiliary pump wheel 13. Here also, the entire inside torus 16 of the auxiliary pump wheel 13 (the hatched surface, indicated by the curved bracket) acts as the piston surface in the engaging direction of the coupling, because a relative vacuum exists in the blading 14, 3 through which the working fluid flows. In order to ensure a proper release of the plates, the ring piston 19 is constructed as a step piston.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydrodynamic unit for a transmission of a motor vehicle, comprising:
   a main pump wheel connected with an input shaft and having a blading;
   a turbine wheel connected with an output shaft and having a blading;
   an auxiliary pump wheel having a blading;
   a core being defined by a respective inside torus of each of the main pump wheel blading, the turbine wheel blading, and the auxiliary pump wheel blading, said core containing a working fluid at a pressure; and
   at least one coupling arranged in said core in communication with said working fluid, said pressure of the working fluid biasing said at least one coupling toward a coupled position in which said main pump wheel is coupled with said auxiliary pump wheel, said at least one coupling being selectively communicable with a main transmission pressure which is higher than said pressure of the working fluid to bias said at least one coupling toward an uncoupled position in which said main pump wheel is uncoupled from said auxiliary pump wheel.

2. A hydrodynamic unit according to claim 1, wherein said coupling comprises a piston and a cylinder, one of said piston and said cylinder being mounted on said main pump wheel, and the other of said piston and said cylinder being mounted on said auxiliary pump wheel.

3. A hydrodynamic unit according to claim 2, wherein said auxiliary pump wheel is axially displaceably mounted on said main pump wheel.

4. A hydrodynamic unit according to claim 2, wherein said piston is a ring piston which is formed on the inside torus of the auxiliary pump wheel, and wherein said cylinder is a ring cylinder which is formed on said main pump wheel.

5. A hydrodynamic unit according to claim 3, wherein said piston is a ring piston which formed on the inside torus of the auxiliary pump wheel, and wherein said cylinder is a ring cylinder which is formed on said main pump wheel.

6. A hydrodynamic unit according to claim 4, wherein said ring piston is disposed inside said ring cylinder.

7. A hydrodynamic unit according to claim 5, wherein said ring piston is disposed inside said ring cylinder.

8. A hydrodynamic unit according to claim 2, wherein said main transmission pressure is communicated with a space between the piston and the cylinder.

9. A hydrodynamic unit according to claim 4, wherein said main transmission pressure is communicated with a space between the piston and the cylinder.

10. A hydrodynamic unit according to claim 8, wherein said control pressure line extends through said main pump blading from an outside torus of the main pump wheel blading to said inside torus of the main pump wheel blading.

11. A hydrodynamic unit according to claim 2, wherein at least one of said piston and said cylinder comprises a vent duct for said working fluid.

12. A hydrodynamic unit according to claim 4, wherein at least one of said piston and said cylinder comprises a vent duct for said working fluid.

13. A hydrodynamic unit according to claim 12, wherein said vent duct is a ring duct in said ring cylinder.

14. A hydrodynamic unit according to claim 5, wherein said ring cylinder comprises a vent duct for said working fluid which is configured to control the axial displacement of said auxiliary pump wheel.

15. A hydrodynamic unit according to claim 4, further comprising a spring element arranged between said ring piston and an abutment of said ring cylinder, said spring element being configured to bias said ring piston toward said ring cylinder.

16. A hydrodynamic unit for a transmission of a motor vehicle, comprising:
   a main pump wheel connected with an input shaft and having a blading;
   a turbine wheel connected with an output shaft and having a blading;
   an auxiliary pump wheel having a blading;
   a core being defined by a respective inside torus of each of the main pump wheel blading, the turbine wheel blading, and the auxiliary pump wheel blading, said core containing a working fluid at a pressure; and
   at least one coupling arranged in said core to selectively couple and uncouple said main pump wheel with said auxiliary pump wheel, said coupling having a first surface which is exposed to said pressure of the working fluid to couple said auxiliary pump wheel with said main pump wheel, said coupling having a second surface facing opposite said first surface, said second surface being selectively communicable with a main transmission pressure which is higher than said pressure of the working fluid to uncouple said main pump wheel from said auxiliary pump wheel.

17. A hydrodynamic unit for a transmission of a motor vehicle, comprising:
   a main pump wheel connected with an input shaft and having a blading;
   an auxiliary pump wheel having a blading;
   a core being defined by a respective inside torus of each of the main pump wheel blading, the turbine wheel blading, and the auxiliary pump wheel blading, said core containing a working fluid at a pressure; and
   at least one coupling arranged in said core which is selectively movable between a coupled position in which said main pump wheel is coupled with said auxiliary pump wheel and an uncoupled position in which said main pump wheel is uncoupled from said auxiliary pump wheel, said pressure of the working fluid contained in the core automatically providing a coupling force on said at least one coupling in a first direction toward said coupled position, said coupling being selectively communicable with a main transmission pressure which is higher than said pressure of the working fluid such that communication with said main transmission pressure provides an uncoupling force on said coupling in a second direction opposite said first direction, said uncoupling force being greater than said coupling force such that said coupling is moved to said uncoupled position.

18. A hydrodynamic unit according to claim 1, wherein a control pressure line provides said communication between said coupling and said main transmission pressure, and wherein said control pressure line is one of vented to ambient pressure and sealed off to allow the coupling to move to said coupled position.

19. A hydrodynamic unit according to claim 16, wherein a control pressure line provides said communication between said second surface of the coupling and said main transmission pressure, and wherein said control pressure line is one of vented to ambient pressure and sealed off to allow the main pump wheel to be uncoupled from the auxiliary pump wheel.

20. A hydrodynamic unit according to claim 17, wherein a control pressure line provides said communication between said coupling and said main transmission pressure, and wherein said control pressure line is one of vented to ambient pressure and sealed off to allow the coupling to move to said coupled position.

* * * * *